United States Patent
Chiu et al.

(10) Patent No.: US 8,730,659 B2
(45) Date of Patent: May 20, 2014

(54) MOUNTING APPARATUS FOR EXPANSION CARD

(75) Inventors: Po-Wen Chiu, New Taipei (TW); Wen-Hu Lu, Shenzhen (CN); Zhan-Yang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 289 days.

(21) Appl. No.: 13/227,229

(22) Filed: Sep. 7, 2011

(65) Prior Publication Data

US 2012/0145859 A1    Jun. 14, 2012

(30) Foreign Application Priority Data

Dec. 14, 2010 (CN) .......................... 2010 1 0587463

(51) Int. Cl.
*H05K 5/00* (2006.01)

(52) U.S. Cl.
USPC ............ 361/679.32; 361/679.48; 361/679.58; 361/694; 361/683

(58) Field of Classification Search
USPC ................. 248/231.81, 27.1, 221.11, 222.11, 248/225.11; 361/679.32, 679.41, 679.48, 361/695, 697, 721, 679.43, 679.55, 679.58, 361/679.6, 679, 683, 760, 796
See application file for complete search history.

(56) References Cited

U.S. PATENT DOCUMENTS

| | | | |
|---|---|---|---|
| 5,338,214 A * | 8/1994 | Steffes et al. ............. | 361/679.32 |
| 5,831,821 A * | 11/1998 | Scholder et al. ......... | 361/679.32 |
| 6,002,586 A * | 12/1999 | Chen et al. ................. | 361/695 |
| 6,320,752 B1 * | 11/2001 | Jang .............................. | 361/740 |
| 6,411,511 B1 * | 6/2002 | Chen ............................ | 361/697 |
| 7,595,994 B1 * | 9/2009 | Sun .............................. | 361/721 |
| 7,852,623 B2 * | 12/2010 | Lu ............................ | 361/679.48 |
| 8,451,623 B2 * | 5/2013 | Chiu et al. ................ | 361/679.41 |

* cited by examiner

*Primary Examiner* — Tan Le
(74) *Attorney, Agent, or Firm* — Novak Druce Connolly Bove + Quigg LLP

(57) ABSTRACT

A mounting apparatus for expansion card comprising a chassis, a mounting frame secured to the chassis and located in a first portion of the chassis, a hull secured to the chassis and located in a second portion of the chassis opposite to the first portion, and a mounting member. The mounting member comprises an elastically deformable latching portion. The hull comprises two limiting portions and defines a positioning opening, and the mounting member is engaged in the two limiting portions and is slidable relative to the hull. The mounting member is slid to a side edge of the hull towards to the mounting frame when the elastically deformable latching portion is engaged in the positioning opening.

20 Claims, 4 Drawing Sheets

MOUNTING APPARATUS FOR EXPANSION CARD

BACKGROUND

1. Technical Field

The present disclosure relates to mounting apparatuses, and more particularly to a mounting apparatus for securing expansion cards in an electronic device.

2. Description of Related Art

A computer system usually includes expansion cards, such as sound cards, video cards, and graphics cards, for enhancing capabilities of the computer system. The expansion cards are often fixed in the computer system with screws. However, installing screws to fix the expansion cards is very laborious and time-consuming.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
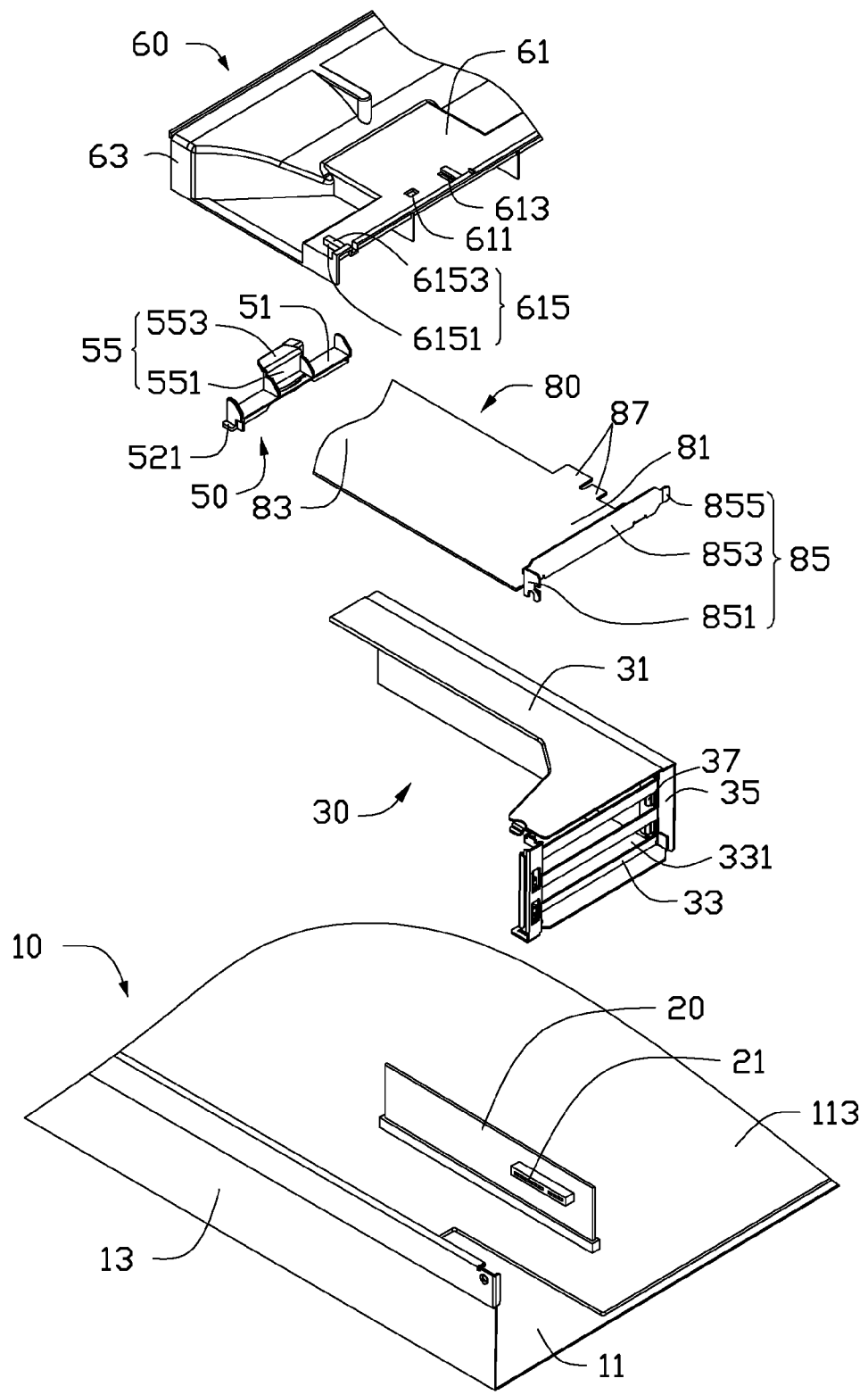
FIG. 1 is an exploded, isometric view of a mounting apparatus for expansion card and an expansion card in accordance with an exemplary embodiment.

Referring to FIG. 1, a mounting apparatus for mounting an expansion card 80, includes a chassis 10, a mounting frame 30, a mounting member 50, and a hull 60.

Figure 3:
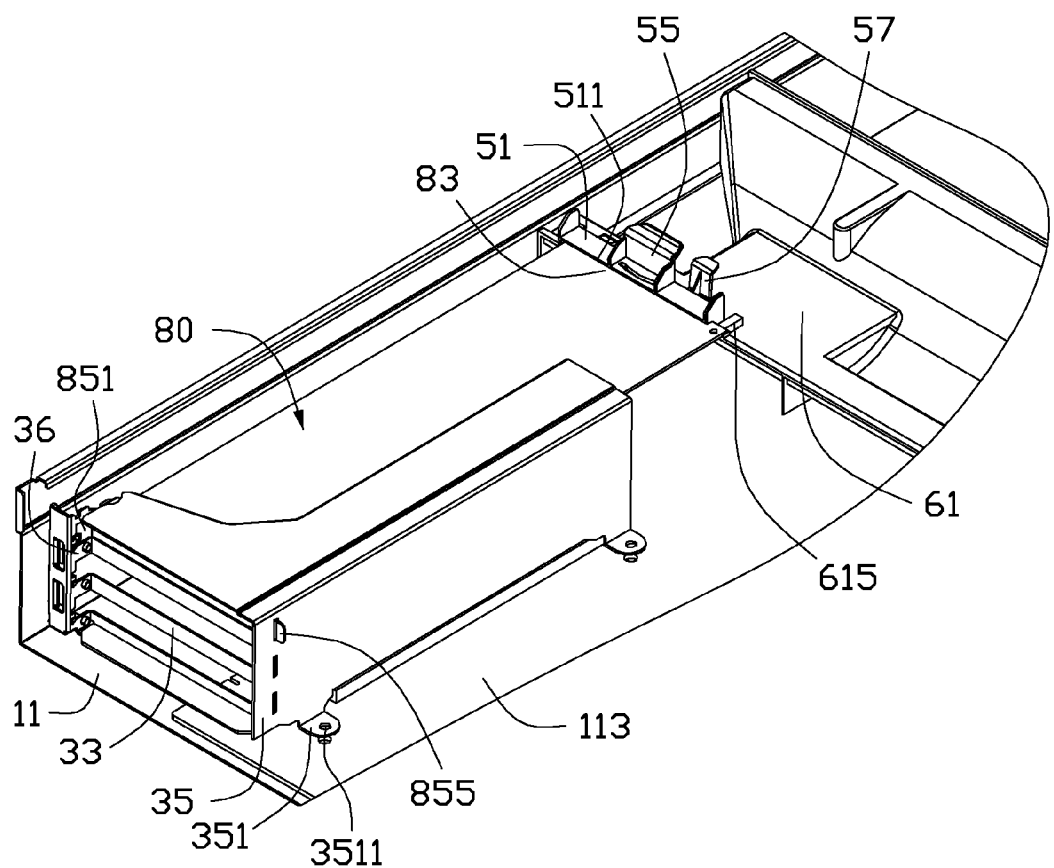
FIG. 3 is an isometric view of the assembled mounting apparatus for expansion card and the expansion card of FIG. 1.

The expansion card 80 includes a first end 81 and second end 83 opposite to the first end 81 (as shown in FIG. 3). A mounting tab 85 is secured in the first end 81. The mounting tab 85 includes a body 853, a mounting portion 851, and an inserting portion 855. The mounting portion 851 is located on an end of the body 853. The inserting portion 855 extends from the other end of the body 853. A connecting portion 87 is located on the bottom end of the expansion card 80.

The chassis 10 includes a bottom plate 11 and a side plate 13. In one embodiment, the side plate 13 is substantially perpendicular to the bottom plate 11. A motherboard 113 is secured to the bottom plate 11. A riser card 20 is secured to the motherboard 113 and is substantially parallel to the side plate 13. An inserting end 21 is located on the riser card 20.

The mounting frame 30 includes a top wall 31, a rear wall 33 and a sidewall 35. The rear wall 33 defines a plurality of slots 331. A mounting plate 36 extends from a side edge of the sidewall 35 (shown as FIG. 3). A bridge portion (not shown) is located in the sidewall 35, for receiving the inserting portion 855. A blocking piece 37 extends from each edge of each slot 331. A gap is defined between the blocking piece 37 and the rear wall 33. The rear wall 33 and the sidewall 35 define a plurality of mounting tabs 351. Each mounting tab 351 defines a mounting hole 3511. A locking member, such as a screw, is inserted into the mounting hole 3511, to secure the mounting frame 30 to the motherboard 113.

The hull 60 includes a top plate 61 and a flange 63. The top plate 61 is substantially perpendicular to the flange 63, and defines a positioning opening 611. Two limiting portions 615 extend from the top plate 61. The positioning opening 611 is located between the two limiting portions 615. Each limiting portion 615 includes a first limiting board 6151 and a second limiting board 6153. The first limiting board 6151 is substantially perpendicular to the top plate 61. The second limiting board 6153 extends from a top edge of the first limiting board 6151 and is substantially parallel to the top plate 61. A limiting slot 613 is defined between each limiting portion 615 and the top plate 61. In one embodiment, the hull 60 is an air duct. The hull 60 is secured to the chassis 10 for guiding air flow to the motherboard 113.

Figure 2:
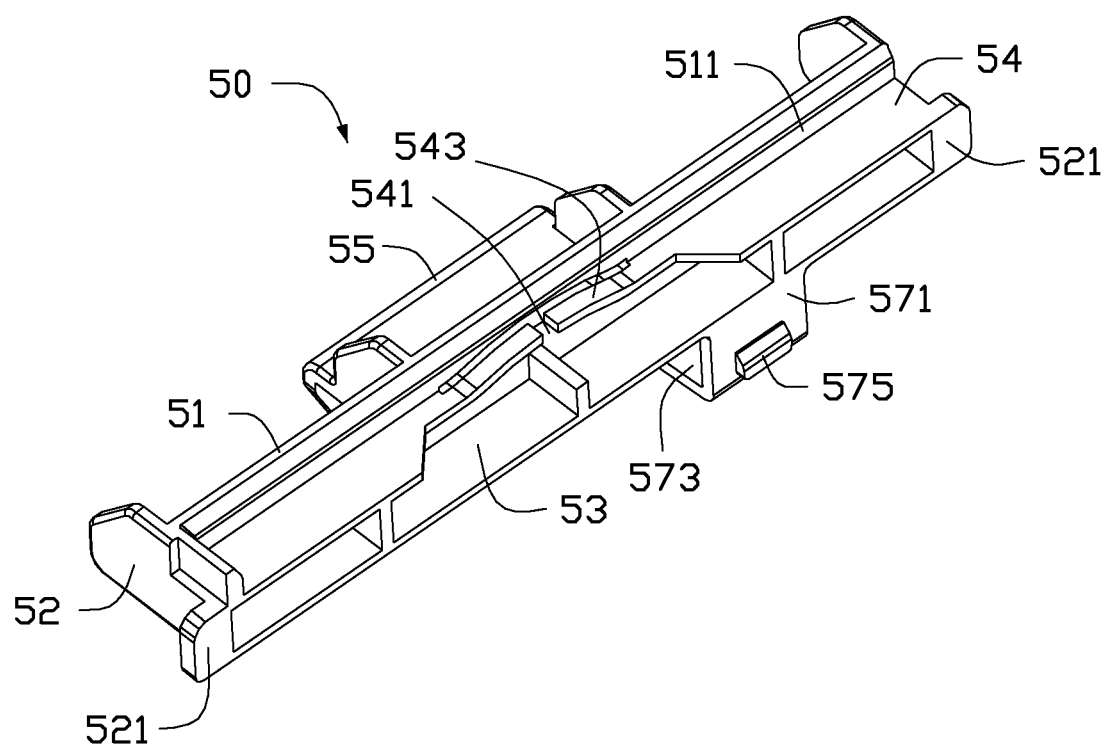
FIG. 2 is an isometric view of a mounting member of FIG. 1.

Referring to FIG. 2, the mounting member 50 includes a first panel 51, two second panels 52, a first maintaining plate 53, a second maintaining plate 54, an operating portion 55, and an elastically deformable latching portion 57 (shown as FIG. 3). The first panel 51 is substantially perpendicular to the first maintaining plate 53 and the second maintaining plate 54. The second panels 52 are connected and substantially perpendicular to the first panel 51. The first maintaining plate 53 and the second maintaining plate 54 run substantially parallel and are perpendicularly attached to the first panel 51. A positioning portion 511 extends from an edge of the first panel 51 and is substantially parallel to the first panel 51. A limiting piece 521 extends from each second panel and is substantially parallel to the first panel 51. The second maintaining plate 54 defines a gap 541. A pressing piece 543 extends from each side edge of the gap 541. The pressing piece 543 extends out over the gap 541 and is elastically deformable. The operating portion 55 extends from the first panel 51 and includes a mounting board 551 and an operating board 553. The mounting board 551 is substantially perpendicular to the first panel 51. The operating board 553 extends from a top edge of the mounting board 551 and is substantially perpendicular to the mounting board 551. The latching portion 57 includes a latching piece 571 and an operating piece 573. The latching piece 571 extends from a free edge of the first maintaining plate 53 and is substantially parallel to the first panel 51. A latching block 575 is located on the latching piece 571. The operating piece 573 extends from the latching piece 571 towards the first panel 51. In one embodiment, the operating piece 573 is substantially an "L" shaped.

Figure 4:
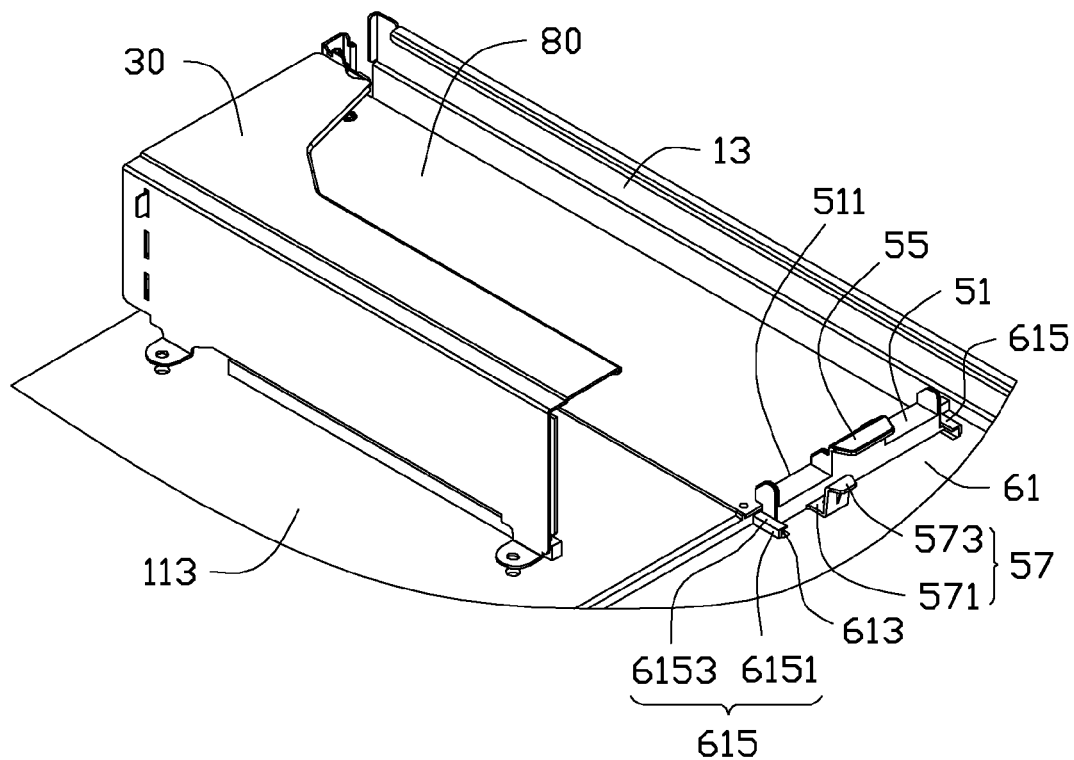
FIG. 4 is similar to FIG. 3, but viewed from another aspect.

Referring to FIGS. 3-4, in assembly of the mounting member 50, the mounting member 50 is moved to position the limiting piece 521 between the second limiting board 6153 and the top plate 61. The latching block 575 abuts the top plate 61. The mounting member 50 is slid until the limiting piece 521 is received between the limiting portion 615 and the top plate 61. The latching portion 57 is elastically deformed and abuts the top plate 61.

In assembly of the expansion card 80, the inserting portion 855 is inserted into the bridge portion of the sidewall 35. The connecting portion 87 is inserted into the inserting end 21. The mounting portion 851 abuts the mounting plate 36 and is secured to the mounting plate 36 with a screw. The second end 83 is placed on the hull 60 and is adjacent to the limiting slot 613. The operating board 553 is pulled to slid the mounting member 50 along the limiting slot 613 until the latching block 575 is aligned with the positioning opening 611. Then, the pressing piece 543 is elastically deformed and abuts the second end 83. The second maintaining plate 54 abuts the expansion card 80. The second end 83 is located between the positioning portion 511 and the top plate 61. The latching portion 57 is elastically rebounded to engage the latching block 575 in the positioning opening 611. Thus, the second end 83 is secured between the positioning portion 511 and the top plate 61.

In disassembly, the operating piece 573 is pulled upwards to disengage the latching block 575 from the positioning opening 611. The pressing piece 543 elastically rebounds to slide the mounting member 50 along the direction away from the expansion card 80. Thus, the second end 83 is disengaged from the positioning portion 511. Then, the expansion card 80 can be removed from the chassis 10.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and the arrangement of parts within the principles of the disclosure, to the full extent indicated by the broad general meaning of the terms in which the appended claims are expressed.

What is claimed is:

1. A mounting apparatus for expansion card comprising:
a chassis;
a mounting frame secured to the chassis and located in a first portion of the chassis;
a hull secured to the chassis and located in a second portion of the chassis opposite to the first portion; and
a mounting member comprising an elastically deformable latching portion;
wherein the hull comprises two limiting portions and defines a positioning opening, each limiting portion defines a limiting slot, and the mounting member is slidably engaged in the limiting slots of the two limiting portions and is slidable relative to the hull; the mounting member is slid to a side edge of the hull towards to the mounting frame when the elastically deformable latching portion is engaged in the positioning opening; and when an expansion card is secured, a first end of the expansion card is secured to the mounting frame, and a second end of the expansion card opposite to the first end is secured between the hull and the mounting member.

2. The mounting apparatus for expansion card of claim 1, wherein the chassis comprises a bottom plate and a flange that is substantially perpendicular to the bottom plate, the mounting frame comprises a rear wall that is substantially perpendicular to the flange, and the hull is adapted to guide air flow flowing towards the rear wall.

3. The mounting apparatus for expansion card of claim 1, wherein the mounting member comprises a first panel, two second panels, a first maintaining plate and a second maintaining plate; the first panel is substantially perpendicular to the first maintaining plate and the second maintaining plate and the two second panels are substantially perpendicular and are connected to the first panel, the first maintaining plate and the second maintaining plate.

4. The mounting apparatus for expansion card of claim 3, wherein a positioning portion is located on the first panel, the positioning portion is substantially perpendicular to the second maintaining plate, and the positioning portion abuts a top surface of the expansion card when the expansion card is secured.

5. The mounting apparatus for expansion card of claim 3, wherein the second maintaining plate defines a gap, an elastically deformable pressing piece extends from a side edge of the gap and towards a direction away from the first maintaining plate.

6. The mounting apparatus for expansion card of claim 5, wherein the elastically deformable pressing piece is elastically deformed towards the first maintaining plate and abuts the second end of the expansion card when the expansion card is secured.

7. The mounting apparatus for expansion card of claim 4, wherein the hull comprises a top plate, the positioning opening is defined in the top plate, and the two limiting portions extend from the top plate; and when the expansion card is secured, the second end of the expansion card is secured between the top plate and the positioning portion.

8. The mounting apparatus for expansion card of claim 7, wherein each limiting portion comprises a first limiting board and a second limiting board, the first limiting board is substantially perpendicular to the top plate, and the second limiting board is substantially parallel to the top plate; and a limiting piece extends from each of the two second panels and is engaged between the top plate and one of the two limiting portions.

9. The mounting apparatus for expansion card of claim 3, wherein the elastically deformable latching portion comprises a latching piece, and the latching piece extends from a free edge of the first maintaining plate and is substantially perpendicular to the second maintaining plate; and a latching block is located on the latching piece and is engaged in the positioning opening.

10. The mounting apparatus for expansion card of claim 9, wherein an operating piece extends from the latching piece and is operable to deform the elastically deformable latching portion to disengage from the positioning opening.

11. A mounting apparatus for expansion card comprising:
a chassis;
a mounting frame secured to the chassis and located in a first portion of the chassis;
a hull secured to the chassis and located in a second portion of the chassis opposite to the first portion; and
a mounting member, secured to the hull, comprising a positioning portion;
wherein the hull comprises a top plate and two limiting portions, each limiting portion comprises a first limiting board extending from the top plate, and a second limiting board; the first limiting board is substantially perpendicular to the top plate; and the second limiting board is substantially parallel to the top plate; each end of the mounting member is engaged between the second limiting board and the top plate; and the positioning portion is substantially parallel to the top plate; when an expansion card is secured, a first end of the expansion card is secured to the mounting frame, and a second end of the expansion card opposite to the first end is secured between the positioning portion and the top plate.

12. The mounting apparatus for expansion card of claim 11, wherein the mounting member further comprises an elastically deformable latching portion, the top plate defines a positioning opening, and the elastically deformable latching portion is engaged in the positioning opening.

13. The mounting apparatus for expansion card of claim 11, wherein two limiting portions are located on the top plate, the mounting member is located between the two limiting portions and engaged with the two limiting portions.

14. The mounting apparatus for expansion card of claim 12, wherein the chassis comprises a bottom plate and a flange that is substantially perpendicular to the bottom plate, the mounting frame comprises a rear wall that is substantially perpendicular to the flange, and the hull is adapted to guide air flow flowing towards the rear wall.

15. The mounting apparatus for expansion card of claim 13, wherein the mounting member comprises a first panel, two second panels, a first maintaining plate and a second maintaining plate; the first panel is substantially perpendicular to the first maintaining plate and the second maintaining plate, and the two second panels are substantially perpendicular and are connected to the first panel, the first maintaining plate and the second maintaining plate.

16. The mounting apparatus for expansion card of claim 15, wherein the second maintaining plate defines a gap, an elastically deformable pressing piece extends from a side edge of the gap and towards a direction away from the first maintaining plate.

17. The mounting apparatus for expansion card of claim 16, wherein the elastically deformable pressing piece is elastically deformed towards the first maintaining plate and abuts the second end of the expansion card when the expansion card is secured.

18. The mounting apparatus for expansion card of claim 15, wherein a limiting piece extends from each of the two second panels, and is slidably engaged between the top plate and one of the two limiting portions; and the mounting member is slidable relative to the hull.

19. The mounting apparatus for expansion card of claim 15, wherein the elastically deformable latching portion comprises a latching piece, the latching piece extends from a free edge of the first maintaining piece and is substantially perpendicular to the second maintaining piece; a latching block is located on the latching piece and is engaged in the positioning opening.

20. The mounting apparatus for expansion card of claim 19, wherein an operating piece extends from the latching piece and is operable to deform the elastically deformable latching portion to disengage from the positioning opening.

* * * * *